M. YARROW.
MACHINE FOR THE MANUFACTURE OF EARTHENWARE PIPES.
APPLICATION FILED MAY 25, 1908.

953,887.

Patented Apr. 5, 1910.
5 SHEETS—SHEET 4.

Witnesses
P. H. Pezzetti
F. R. Poulstone

Inventor
Matthew Yarrow.
by Hugh Brown Quinby May
Attorneys

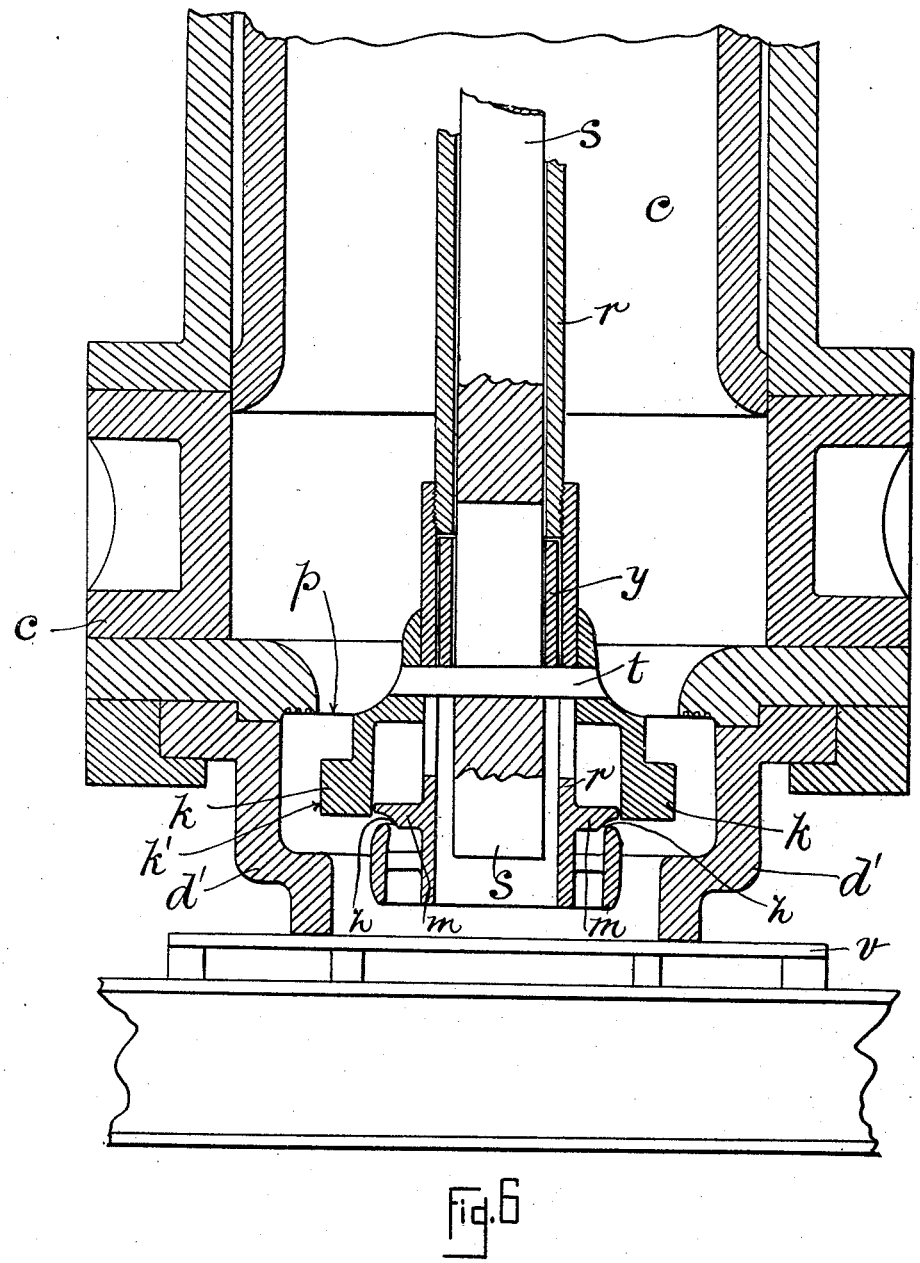

UNITED STATES PATENT OFFICE.

MATTHEW YARROW, OF SMITHILLS, BOLTON, ENGLAND, ASSIGNOR TO YARROW AND COMPANY (BOLTON) LIMITED, OF BOLTON, ENGLAND, A COMPANY OF ENGLAND.

MACHINE FOR THE MANUFACTURE OF EARTHENWARE PIPES.

953,887.  Specification of Letters Patent.  Patented Apr. 5, 1910.

Application filed May 25, 1908. Serial No. 434,835.

*To all whom it may concern:*

Be it known that I, MATTHEW YARROW, a subject of the King of Great Britain, and resident of 9 Ivy road, Smithills, Bolton, in the county of Lancaster, England, have invented certain new and useful Improvements in Machines for the Manufacture of Earthenware Pipes and the Like, of which the following description, together with the accompanying sheets of drawings, is a specification.

This invention relates to the manufacture of earthenware pipes or mains and the like especially when such are of considerable size or diameter and it is desirable that they should be formed in the apparatus or machine with the socket part or end of the pipe at the top, while the spigot end is the one upon which the pipe rests, this arrangement being desirable to obviate the necessity of having to turn over the newly made pipes so that they may rest upon their spigot ends because their socket ends in the newly made or fictile condition are not strong enough to support them.

The production of machines or apparatus for attaining this result, is the object of my present invention.

Figure 1:
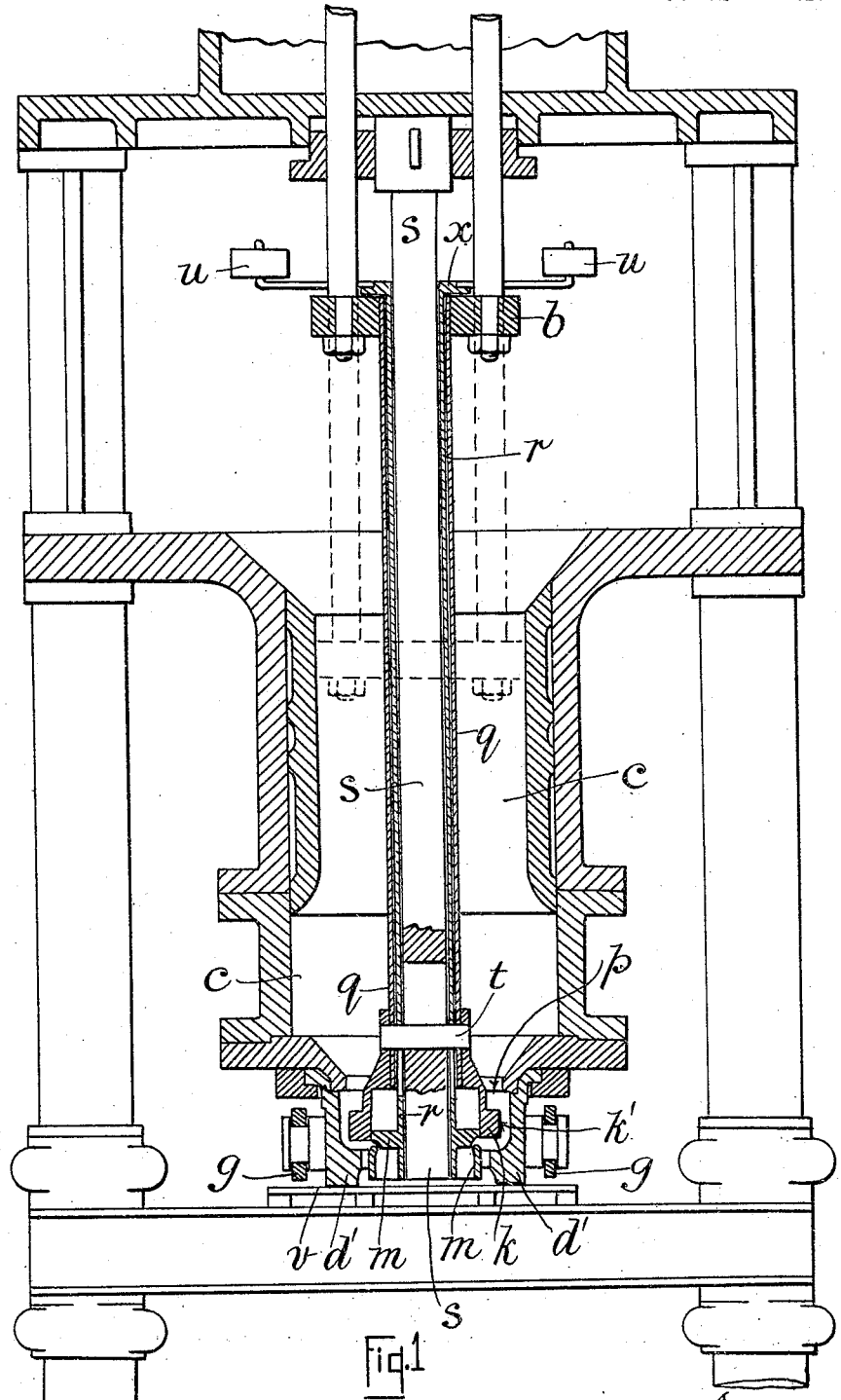
Figure 2:
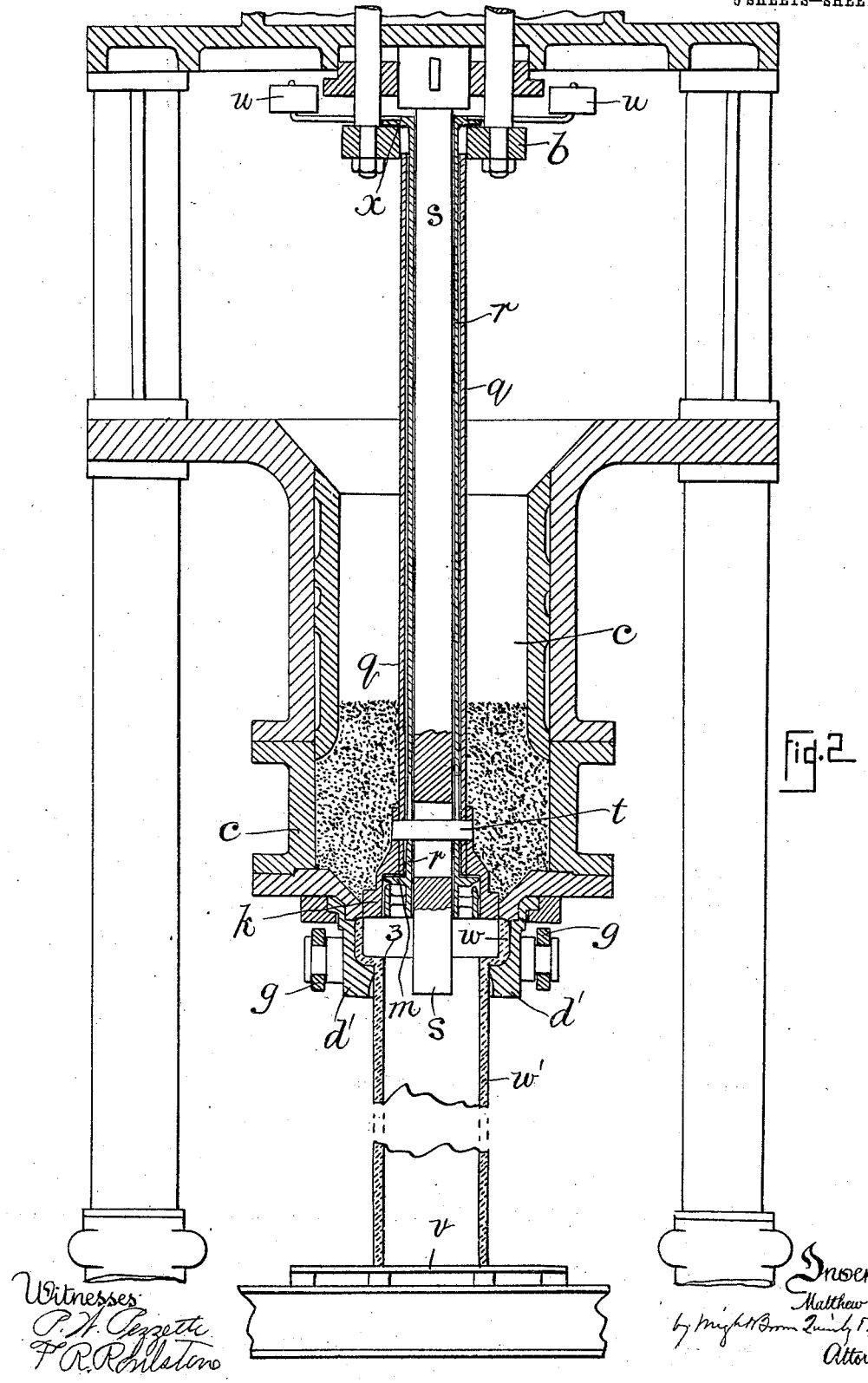
Figure 3:
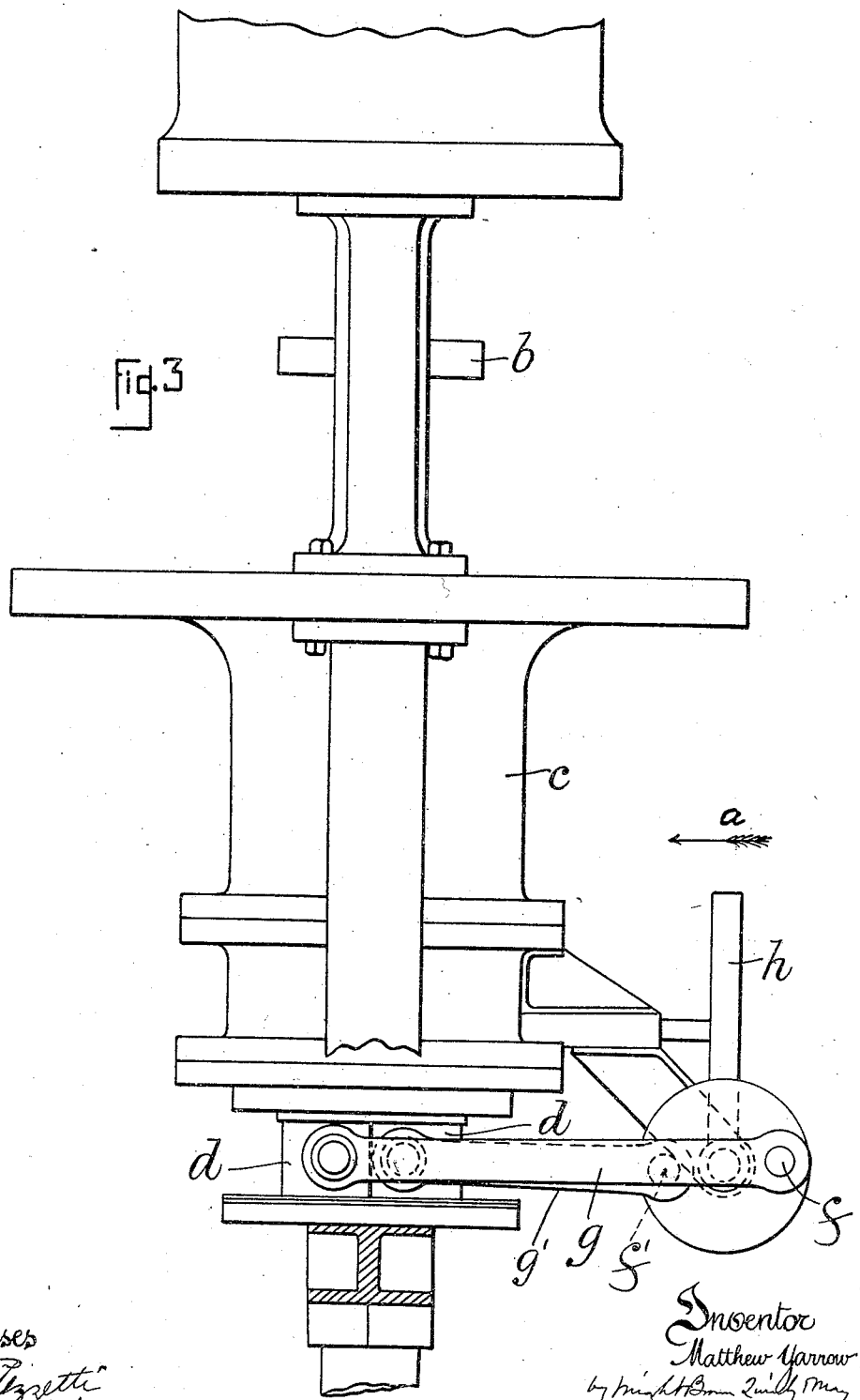
Figure 4:
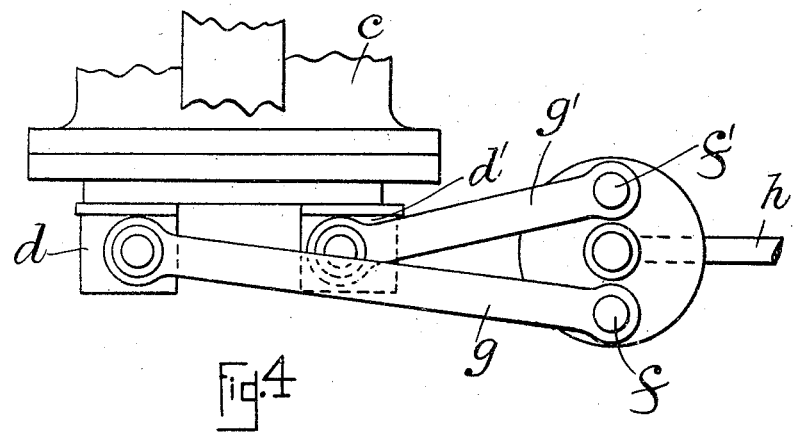
Figure 5:
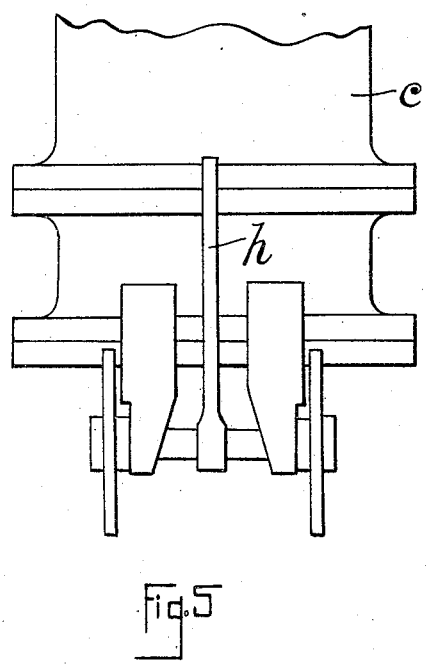

In the accompanying sheets of drawings which are illustrative of my invention:—Figure 1 is a part sectional elevation of a machine showing the position of the several parts at the commencement of pressing or forming a pipe or main. Fig. 2 is a similar view to Fig. 1 but shows the cores as withdrawn to cut off the pipe after it has been formed. Fig. 3 is an elevation of sufficient of a machine for pressing pipes, to show the application of my improved parts. In this view the molds or dies are shown closed as during the pressing or forming of a pipe. Fig. 4 is a similar view to Fig. 3 but only shows sufficient of the apparatus to illustrate the dies as open. Fig. 5 is a view of the parts shown by Fig. 3 as seen in the direction indicated by the arrow $a$, (Fig. 3.) Fig. 6 is a sectional elevation showing an alternative construction of the parts carrying the cores.

Similar letters and figures of reference indicate similar parts throughout the several views.

In carrying my invention into effect, I make use of the class of apparatus wherein pressure pistons $b$ are employed in conjunction with cylinders $c$ for forcing the clay through the dies or mold in manner well known. In connection with this class of apparatus I arrange the outer die or mold $d, d'$ in the bell or lower opening of the cylinder $c$ to form the barrel $w'$ as well as the socket $w$ of the pipe or main shown by Fig. 2. This die is formed in semicircular parts $d$ and $d'$ so that by the cranks $f, f'$ and connecting rods $g, g'$ the two parts may be pressed together (as shown by Fig. 3) by operating the handle $h$ and leaving it in the position shown. Or by moving said handle $h$ said dies $d, d'$ may be separated from each other and left in the positions shown by Fig. 4, in which position they will allow any socket of a pipe that may have been formed within them to be removed therefrom.

Within the die or mold formed by the parts $d, d'$ are mounted the cores $k, m$ which respectively form the interior openings in the socket and barrel parts of the pipe or main when pressed, the core $m$ being formed to take within the core $k$ while the outer diameter of this latter at $k'$ is equal to the diameter of opening at $p$ at the base of the cylinder $c$. The core $k$ is secured to the sleeve $q$ which takes over the sleeve $r$ upon the lower end of which is fixed the core $m$, and these sleeves are mounted upon so as to slide over a central guide shaft $s$ so that by a cotter $t$ passing through a slot and being fixed to the sleeve $q$ while it will move within an elongated slot in the sleeve $r$ as well as within a longer or more elongated slot in the fixed guiding shaft $s$, the cores $k$ and $m$ are moved or operated as hereinafter explained. The piston $b$ takes loosely over the outer sleeve $q$ so that its movements upon the same will allow said sleeve $q$ to be separately actuated, as by gravity or otherwise.

At the commencement of pressing or forming a pipe the dies $d, d'$ are pressed against each other as shown by Fig. 3, the cylinder $c$ has the desired and usual quantity of clay placed within it, and the cores $k$ and $m$ are in their lowest positions shown by Fig. 1, in which position they are supported by the cotter $t$ resting upon the bottom of the slot in the shaft $s$ while the top of the slot through the sleeve $r$ rests upon the top of the cotter. These cores $k$ and $m$ are brought by gravity into the positions stated and should their ordinary weight be too little to effect this, then additional weights $u$ are mounted upon them. The pressing operations may then commence by which as the piston $b$ descends the clay is forced down through the space intervening between the cores $k$, $m$ and the dies $d$, $d'$, the barrel $w'$ of the pipe being formed by the lower core $m$ as the table $v$ which receives same is caused to recede until the desired length of such barrel part $w'$ is produced. The pressing actions are then arrested and the piston is caused to return to its highest position. When approaching and prior to reaching its said highest position it comes into contact with the overhanging flange $x$ on sleeve $r$ so that as it continues to rise it will carry said sleeve $r$ and its core $m$ with it, while at such time the pressure of the clay on the core $k$ will keep this latter in its lowest position until the bottom of the slot in said sleeve $r$ reaches the cotter $t$. Prior to said cotter being thus reached the sleeve $r$ will have receded sufficiently to carry its core $m$ into or within the core $k$ so that the clay will have been clearly left at the shoulder 3 of the pipe $w'$. The piston $b$ continuing its upward movement from this point, carries with it the sleeve $q$ since the cotter $t$ which is fixed to said sleeve will be resting upon the bottom of the slot in said sleeve $r$ so that in thus rising it may carry with it its core $k$ causing same to enter the opening $p$ as shown by Fig. 2 where it will have cut off the clay from the end of the socket $w$ of the pipe. The dies $d$, $d'$ are then moved apart by the operator turning the handle $h$ and so the properly formed pipe is left free supported upon its spigot end on the table or supporting piece $v$ from which it may be removed as will be understood.

Instead of making use of two sleeves $q$ and $r$ the sleeve $r$ may be made to have the core $k$ to loosely take over it, while its own core $m$ is, as before, securely fixed to it, as indicated in Fig. 6. In this case as the core $k$ is situated and operating loosely in the body of clay while the latter is being pressed, it is liable to have portions of such clay forced down between it and the sleeve $r$, to obviate which I may employ a loose hoop $y$ for protecting the slot in said sleeve $r$ from being filled with clay, said hoop resting loosely on the cotter $t$, and remaining thereon when the sleeve $r$ rises and its slot is above the cotter, so that the hoop constitutes a guard which obstructs the slot and prevents the passage of clay therethrough. Or I may extend the upper part of the core $k$ so as to cover the slot in the sleeve $r$ when in its raised position.

Appropriately formed openings $z$ are made through the core $m$ so that air may escape thereby and allow the clay to be more firmly forced into this part to form a better shoulder on the resultant pipe.

I may here observe that my improved apparatus may be employed in the manufacture of retorts or other similar earthenware articles, and that my arrangement of cores and molds may be employed on other forms of machines or presses than that herein described and illustrated by the accompanying drawings.

Such being the nature and object of my invention what I claim is:—

1. In apparatus of the class described, a cylinder, a piston arranged to operate within said cylinder, a movable core mounted at a part leading from said cylinder, a supplementary movable core mounted to operate within the other core and means for actuating said cores substantially as herein set forth.

2. In apparatus of the class described, a cylinder, a piston arranged to operate in said cylinder, a central guiding shaft, a sleeve taking over said shaft, a core mounted on said sleeve, another sleeve taking over the former, a core secured to said outer sleeve, means for connecting one sleeve to, so as to be actuated by, the other sleeve, and means whereby both sleeves may be actuated substantially as herein specified.

3. In apparatus of the class described, a cylinder, a piston operating within said cylinder, a central guiding shaft, outer and inner sleeves mounted to take over said shaft, cores mounted on the lower extremities of said sleeves, weighting devices secured to so as to act upon the inner sleeve and means for actuating said inner and outer sleeves and their cores substantially as herein set forth.

4. In apparatus of the class described, a cylinder, a piston operating within said cylinder, an outer and an inner core mounted within a passage leading from said cylinder, means for actuating said cores, dies or molds arranged and mounted in position to form the passage surrounding the cores, said molds being formed in halves and means for actuating said molds substantially as herein specified.

5. In apparatus of the class described, a cylinder, a piston mounted within said cylinder, a central guiding shaft, a sleeve taking over said shaft, a core secured to the lower end of said sleeve, another core mounted to take loosely over the central core and its sleeve, a cotter or cross bolt secured to said outer core and passing through a slot in the sleeve within as well as through a slot in the central shaft and means for actuating the sleeve so that it may raise both of the cores substantially as herein set forth.

6. In apparatus of the class described, a cylinder, a piston operating within said cylinder, a central guide shaft, a sleeve taking over said shaft, a core secured to said sleeve, another core fitting loosely over the inner core, a cross piece or cotter operating within slots in the central shaft and the sleeve carrying the inner core, a guard for covering the slots in the sleeve and means for actuating said sleeve so as to move or operate the cores substantially as herein set forth.

In testimony whereof I have affixed my signature in presence of two witnesses.

MATTHEW YARROW.

Witnesses:
    SAMUEL HEY,
    JOHN WHITEHEAD.